No. 871,055. PATENTED NOV. 12, 1907.
G. R. BOULDING.
BUCK RAKE HAY FORK.
APPLICATION FILED FEB. 9, 1907.
2 SHEETS—SHEET 1.
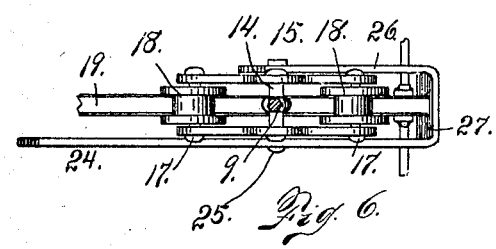
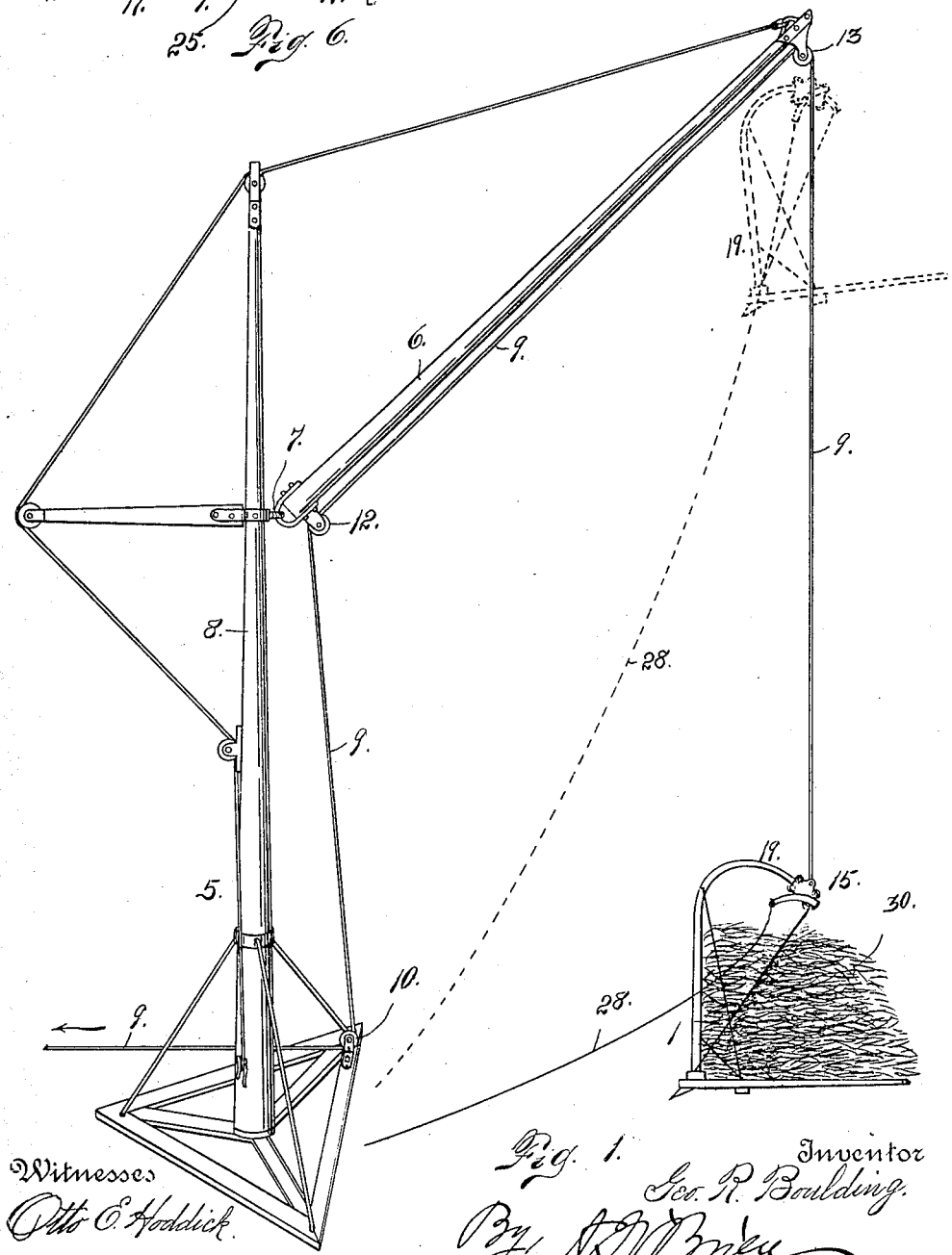

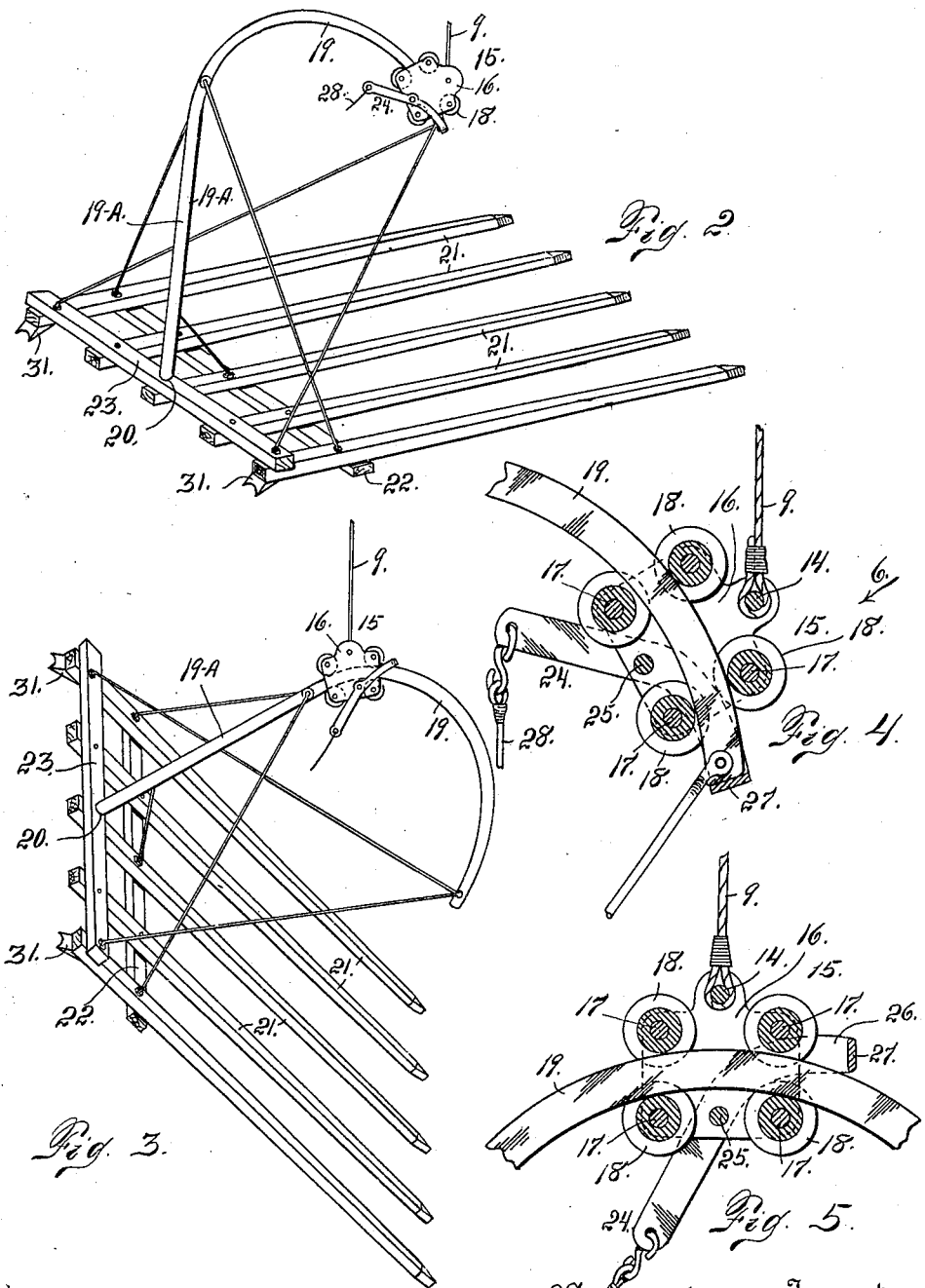

UNITED STATES PATENT OFFICE.

GEORGE R. BOULDING, OF WELLS, NEVADA.

BUCK-RAKE HAY-FORK.

No. 871,055.   Specification of Letters Patent.   Patented Nov. 12, 1907.

Application filed February 9, 1907. Serial No. 356,565.

*To all whom it may concern:*

Be it known that I, GEORGE R. BOULDING, a citizen of the United States, residing at Wells, in the county of Elko and State of Nevada, have invented certain new and useful Improvements in Buck-Rake Hay-Forks; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in hay forks adapted for use with rakes which are known by different titles as buck sweep or bull rakes. In my improved construction the fork or hay carrying device, is constructed somewhat after the manner of a stacker head or the head of an ordinary hay stacker, whereby it is adapted for use with a rake of the character indicated. In my improved construction the teeth of the fork rest upon the ground and the hay is placed by the rake upon the teeth of the fork. This fork is provided with an upright having a forwardly curved arm upon which is movably mounted a block carrying anti-frictional wheels or sheaves, whereby the block when released, is free to travel on the curved arm. Provision is made for locking this block upon the forward extremity of the arm and in a position preferably slightly forward of the center of gravity when the fork is loaded. A trigger is employed for this purpose. When it is desired to discharge the load from the fork, the trigger is actuated to release the block. As the hoisting cable is connected with this block, as soon as it is released it will run upwardly on the arm while the teeth of the fork will be tilted downwardly by the load, allowing the latter to slip therefrom. As soon as the load has been discharged, the center of gravity will be shifted toward the rear extremity of the fork, causing the heavier rear part to move downwardly, and causing the sliding block to move forwardly on the curved arm; and as soon as the fork is lowered to the ground and the pull on the hoisting cable ceases to act, the block will run down to the lower extremity of the curved arm and the trigger will fall into the locking position when the fork is ready for another load.

Having briefly outlined my improved construction, I will proceed to describe the same in detail reference being made to the accompanying drawing in which is illustrated an embodiment thereof.

In this drawing, Figure 1 is a side elevation of my improved hay fork shown in connection with a derrick or hoisting apparatus. Fig. 2 is a detail view showing my improved fork on a larger scale and with the movable block at the lower end of the curved arm. Fig. 3 is a detail view of the fork showing the sliding block in the position which it assumes just as the load has left the same. Fig. 4 shows the sliding block on an enlarged scale and in a position corresponding with that shown in Fig. 2. Fig. 5 shows the same block in the position on the curved arm corresponding with that shown in Fig. 3 and on the same scale as Fig. 4. Fig. 6 is a view of the suspension block and its connections looking in the direction of arrow 6 in Fig. 4.

The same reference characters indicate the same parts in all the views.

Let the numeral 5 designate a derrick which may be of any suitable construction. This derrick is provided with an arm 6 movably connected at 7 with the upright shaft or boom 8. The hoisting cable 9 passes under a guide pulley 10 at the base, upwardly around a guide 12 at the lower extremity of the arm 6, and thence over a guide 13 at the upper extremity of the arm 6. This cable then passes downwardly (see Fig. 1) and is connected with a pin 14 mounted on the sliding block which in its entirety will be designated 15. This block is composed of two similar plates 16 through which is passed a number of pins or journals 17 upon which are mounted grooved sheaves 18. As shown in the drawing there are four of these sheaves and they engage a curved arm 19 on opposite sides. This curved arm is a part of an upright 19$^A$ which is secured to the central rear part of the fork as shown at 20. This fork is composed of a number of teeth 21 which extend forwardly from cross bars 22 and 23 with which the teeth are rigidly connected. The upright member 19$^A$ extends vertically from the central part of the bar 23. This upright 19$^A$ merges at its upper extremity in a forwardly curved arm 19 which when the teeth of the fork are in a horizontal position, has its forward extremity located considerably forward of the center of gravity of the fork when it is empty or when there is no load thereon. When, however, the load is placed upon the fork by the rake, the sliding block with which the hoisting cable is connected is so located that the point of suspension is preferably slightly forward of the center of gravity so that as the fork is hoisted the forward extremities of the teeth will be tilted slightly upwardly thus insuring the retaining of the hay or other material upon the fork. During the hoisting of the loaded fork, provision must be made for locking the movable block upon the curved arm otherwise the block would run up to the highest point of the arm and allow the forward extremities of the teeth to tilt downwardly and discharge the load. In order to hold the movable block in the forward position or at the lower extremity of the curved arm 19, I employ a trigger device 24 fulcrumed on the block at 25 and having a forwardly located U-shaped part 26 which when released will assume by gravity the position shown in Figs. 2 and 4, assuming that the movable block is at its lowest limit of movement on the curved arm. When in this position the forward extremity 27 of the U-shaped part engages the lower or forward extremity of the curved arm, and locks the movable block in the forward position; and when the block is in such position, the fork is ready for the load. To facilitate the manipulation of the locking trigger, a pull cord 28 is connected therewith and may be accessible to the operator or person in charge of the apparatus.

From the foregoing description the use and operation of my improved fork will be readily understood. Assuming that the fork is in the position shown in Fig. 1 and that the movable block 15 is at the lower extremity of the curved arm 19, as power is applied to the cable 9 in the direction of the arrow in Fig. 1, the fork together with the load is hoisted and will move upwardly with the teeth in an approximately horizontal position but preferably with their forward extremities slightly higher than their rear extremities, owing to the fact that the point of suspension of the hoisting cable is located slightly forward of the center of gravity of the load. As soon as the fork with its load has been hoisted to the desired height, the operator pulls upon the cord or rope 28, and throws the forward extremity 27 of the locking trigger 24 upwardly, thereby disengaging the curved arm 19 from the said trigger and allowing the movable block to run upwardly on the curved arm in response to the pull of the hoisting cable. This allows the forward extremities of the fork teeth to tilt downwardly under the weight of the load, whereby the hay or other material 30 is allowed to slip from the fork, into position upon the stack or other desired location. At this time the movable block 15 occupies the position approximately shown in Fig. 3; but as soon as the load has left the fork, the center of gravity of the latter will be shifted toward the rear and the block 15 will move forwardly on the curved arm whereby the point of suspension will be directly above the center of gravity of the fork and the latter will be approximately balanced. As soon, however, as the fork is lowered to the ground and the pull on the cable is released, the movable block will run down the curved arm to its lower and forward extremity, and the trigger will drop to the position shown in Figs. 2 and 4, thus locking the movable block in this position. When this occurs the fork is ready for another load and the operation heretofore described is repeated.

The fork is provided at its rear extremity with a pair of anchors 31 whose rear extremities are curved downwardly and adapted to penetrate the earth, whereby the fork is prevented from rearward movement as the hay or other material is shoved thereon by the rake.

Attention is called to the fact that as soon as the load is discharged from the fork, the latter shifts its position to that shown by dotted lines in Fig. 1 whereby the points of the teeth are considerably more elevated than at the instant of the discharge of the load. The position of discharge is indicated in Fig. 3 of the drawing.

Having thus described my invention, what I claim is:

1. A fork of the class described comprising a toothed structure adapted to support the load and provided with a rearwardly located upright, and a forwardly curved arm which when the teeth of the fork are in a horizontal position, has its forward extremity directly downwardly and located considerably in advance of the center of gravity of the fork, a block movably located on said arm and with which the hoisting rope or cable is connected, the said block being provided with a locking trigger adapted to automatically assume a position to hold the block at the forward and downward extremity of the curved arm, and means for actuating the trigger to release the movable block for the purpose set forth.

2. A hay fork provided with a suspension block movably mounted thereon and normally free to change position as the center of gravity of the load changes, and a trigger having a U-shaped extremity for locking the block in a predetermined position.

3. A hay fork provided with a curved arm and a suspension block movable on the arm and normally free to change its position as the center of gravity of the load changes, the said block being provided with rollers to facilitate the movement of the block on the arm.

4. A hay fork provided with a curved arm, a suspension block movable on the arm and normally free to change its position as the center of gravity changes, and a trigger having a U-shaped extremity for locking the block in a predetermined position on the arm.

5. A hay fork provided with a curved arm and a suspension block movable on the arm and normally free to change its position as the center of gravity changes, and a trigger for locking the block on the arm; the locking action of the trigger being automatic when the block is at a predetermined position on the arm.

6. A hay fork provided with a curved suspension arm, and a block movable on the arm and normally free to change its position as the center of gravity of the fork and its load changes, the said block being provided with anti-friction devices to facilitate the movement of the block on the arm.

7. A hay fork provided with a curved suspension arm, and a block movable on the arm and normally free to change its position as the center of gravity changes, the said block being provided with sheaves engaging the arm above and below to facilitate freedom of movement.

8. A hay fork provided with a head having teeth adapted to receive the load from the rake, the rear extremity of the head being provided with anchoring devices to prevent the rearward movement of the head of the fork in response to the push of the rake as the load is placed upon the fork head, substantially as described.

9. A hay fork provided with teeth for supporting the load, a curved suspension arm occupying a position considerably above the teeth in order to make room for the load, and a block movably mounted upon the curved arm and with which block the hoisting cable is connected, the block being provided with means for locking it at the lower and forward extremity of the arm while hoisting the load, the locking means being adapted to be actuated to release the block whereby the latter is allowed to shift its position upon the curved arm to permit the dumping of the load, and then again change its position on the said arm after the load is dumped to conform to the changed position of the fork, substantially as described.

In testimony whereof I affix my signature in presence of two witnesses.

GEORGE R. BOULDING.

Witnesses:
 DENA NELSON,
 MAY GAWLEY.